US012614028B2

(12) United States Patent
Tu

(10) Patent No.: US 12,614,028 B2
(45) Date of Patent: Apr. 28, 2026

(54) LANGUAGE LABELING METHOD AND COMPUTER DEVICE, AND NON-VOLATILE STORAGE MEDIUM

(71) Applicant: BIGO TECHNOLOGY PTE. LTD., Singapore (SG)

(72) Inventor: Zhiqiang Tu, Singapore (SG)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 393 days.

(21) Appl. No.: 18/258,743

(22) PCT Filed: Dec. 28, 2021

(86) PCT No.: PCT/CN2021/141917
§ 371 (c)(1),
(2) Date: Jun. 21, 2023

(87) PCT Pub. No.: WO2022/143608
PCT Pub. Date: Jul. 7, 2022

(65) Prior Publication Data
US 2024/0070389 A1 Feb. 29, 2024

(30) Foreign Application Priority Data

Dec. 31, 2020 (CN) .......................... 202011630350.8

(51) Int. Cl.
*G06F 16/00* (2019.01)
*G06F 16/35* (2019.01)
*G06F 40/263* (2020.01)

(52) U.S. Cl.
CPC ............ *G06F 40/263* (2020.01); *G06F 16/35* (2019.01)

(58) Field of Classification Search
CPC ...... G06F 40/40; G06F 40/263; G06F 40/169; G06F 16/3344; G06F 16/75; G06F 18/23; G06F 16/739
See application file for complete search history.

(56) References Cited

U.S. PATENT DOCUMENTS

2006/0184357 A1 * 8/2006 Ramsey ................ G06F 40/263
704/9
2010/0106499 A1 * 4/2010 Lubowich ............. G10L 15/005
704/235
(Continued)

FOREIGN PATENT DOCUMENTS

CN 108475260 A 8/2018
CN 112017630 A 12/2020
(Continued)

OTHER PUBLICATIONS

International Search Report of the International Searching Authority for State Intellectual Property Office of the People's Republic of China in PCT application No. PCT/CN2021/141917 issued on Mar. 29, 2022, which is an international application to which this application claims priority.

(Continued)

*Primary Examiner* — Olujimi A Adesanya
(74) *Attorney, Agent, or Firm* — Kolitch Romano Dascenzo Gates LLP

(57) ABSTRACT

Provided is a language labeling method, including: determining a language classifier; collecting a plurality of pieces of information correlated to video data, and determining the plurality of pieces of information as a plurality of pieces of video information; dividing the plurality of pieces of video information into target information and reference information; identifying languages to which the plurality of pieces of video information is attributed by inputting the plurality of pieces of video information into the language classifier;

(Continued)

and checking a confidence level of a target language with an aid of reference languages, wherein the target language is a language to which the target information is attributed and the reference languages are a plurality of languages to which the reference information is attributed.

18 Claims, 5 Drawing Sheets

(56)                    References Cited

U.S. PATENT DOCUMENTS

| | | | | |
|---|---|---|---|---|
| 2012/0004899 | A1* | 1/2012 | Arshi | G06Q 30/02 704/8 |
| 2014/0278353 | A1* | 9/2014 | Herdagdelen | G06F 40/40 704/9 |
| 2015/0006148 | A1 | 1/2015 | Goldszmit et al. | |
| 2016/0110340 | A1 | 4/2016 | Bojja et al. | |
| 2016/0239476 | A1 | 8/2016 | Huang | |
| 2017/0300976 | A1 | 10/2017 | Dogruöz et al. | |
| 2017/0366827 | A1* | 12/2017 | Gordon | H04N 21/23418 |
| 2018/0286412 | A1 | 10/2018 | Amsterdam et al. | |
| 2019/0197119 | A1* | 6/2019 | Zhang | G06F 16/35 |
| 2019/0205373 | A1* | 7/2019 | Walsh | H04N 21/435 |
| 2021/0350790 | A1* | 11/2021 | Maystre | G10L 25/00 |
| 2022/0284069 | A1* | 9/2022 | Kwatra | G06F 16/908 |
| 2022/0350851 | A1* | 11/2022 | Kalekar | G06F 16/337 |

FOREIGN PATENT DOCUMENTS

| | | |
|---|---|---|
| CN | 112699671 A | 4/2021 |
| WO | 2019023908 A1 | 2/2019 |

OTHER PUBLICATIONS

Extended European Search Report Communication Pursuant to Rule 62 EPC for European Application No. 21914343.5 dated May 27, 2024, which is a foreign counterpart application to this application.

European Patent Office, Communication Pursuant to Article 94(3) EPC, dated Oct. 11, 2024 in Patent Application No. EP 21914343.5, which is a foreign counterpart application to this U.S. Patent Application.

Iosifidis, Vasileios et al., "Sentiment analysis on big sparse data streams with limited labels", Knowledge and Information Systems, Springer Verlag, London, GB, vol. 62, No. 4, pp. 1393-1432, ISSN: 0219-1377, DOI: 10.1007/S10115-019-01392-9 [retrieved on Aug. 17, 2019]; Aug. 17, 2019.

* cited by examiner

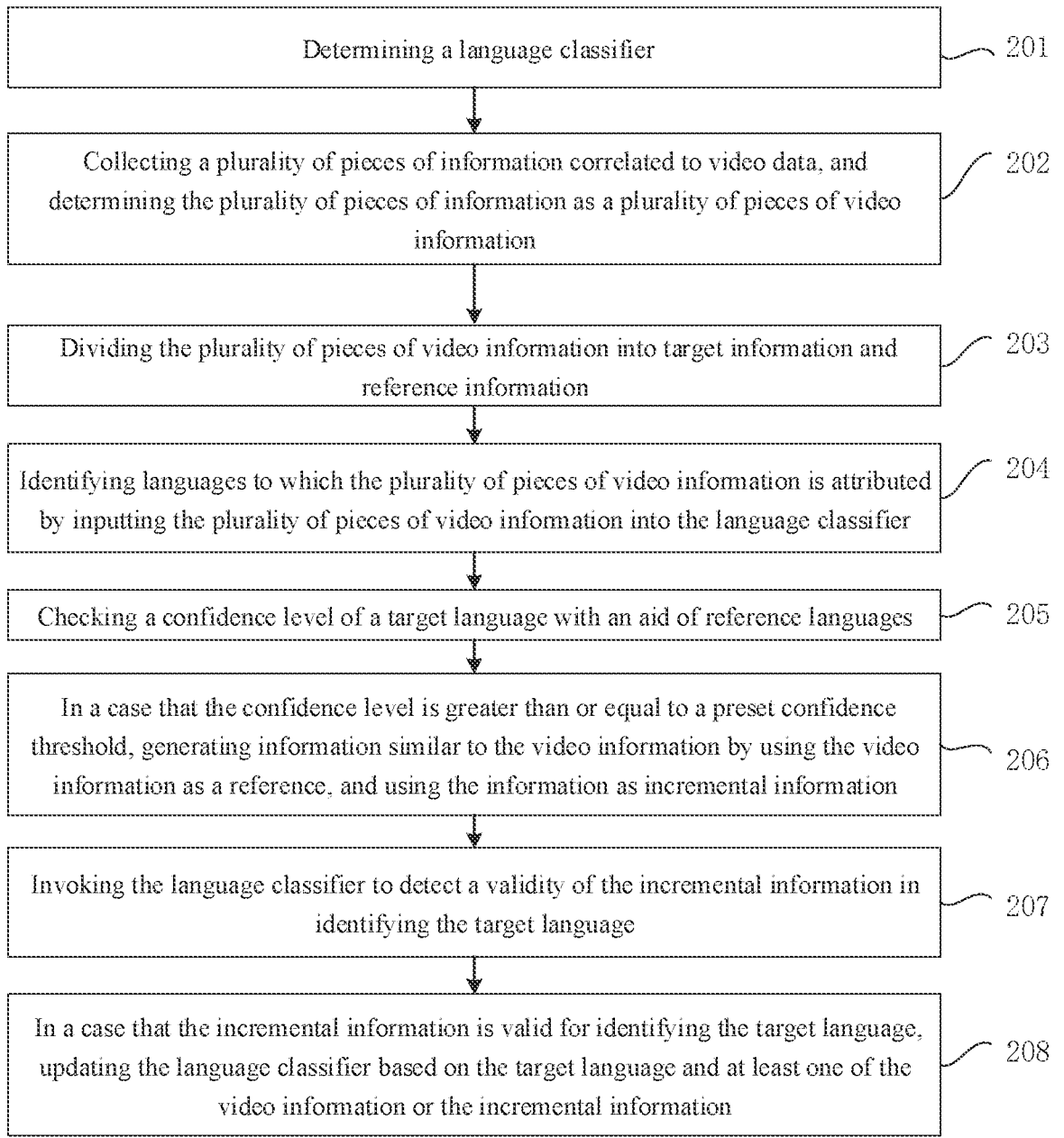

| Determining a language classifier | 201 |

| Collecting a plurality of pieces of information correlated to video data, and determining the plurality of pieces of information as a plurality of pieces of video information | 202 |

| Dividing the plurality of pieces of video information into target information and reference information | 203 |

| Identifying languages to which the plurality of pieces of video information is attributed by inputting the plurality of pieces of video information into the language classifier | 204 |

| Checking a confidence level of a target language with an aid of reference languages | 205 |

| In a case that the confidence level is greater than or equal to a preset confidence threshold, generating information similar to the video information by using the video information as a reference, and using the information as incremental information | 206 |

| Invoking the language classifier to detect a validity of the incremental information in identifying the target language | 207 |

| In a case that the incremental information is valid for identifying the target language, updating the language classifier based on the target language and at least one of the video information or the incremental information | 208 |

FIG. 2

Language classifier determination module — 501

Video information collection module — 502

Video information division module — 503

Video information classification module — 504

Confidence level check module — 505

Computer device 12

System memory 28

30 RAM

34 Storage system

16 Processing unit

Cache memory 32

40

42

18

24 Display

22 I/O interface

20 Network adapter

14 External device

LANGUAGE LABELING METHOD AND COMPUTER DEVICE, AND NON-VOLATILE STORAGE MEDIUM

The present disclosure is a U.S. national stage of international application No. PCT/CN2021/141917, field on Dec. 28, 2021, which claims priority to Chinese Patent Application No. 202011630350.8, filed on Dec. 31, 2020, the contents of which are herein incorporated by reference in their entireties.

TECHNICAL FIELD

The present disclosure relates to the technical field of natural language processing, and in particular, relates to a language labeling method, a language labeling computer device, and a non-volatile computer-readable storage medium.

BACKGROUND

Some video platforms receive video data posted by users, such as short videos, which typically carry text information, and provide language-based services for users, such as searching video data of the same language. When the video data is processed, a classifier is typically used to label the text information with languages.

SUMMARY

The present disclosure provides a language labeling method, a language labeling computer device, and a non-volatile computer-readable storage medium.

According to some embodiments of the present disclosure, a language labeling method is provided. The language labeling method includes:

determining a language classifier;

collecting a plurality of pieces of information correlated to video data, and determining the plurality of pieces of information as a plurality of pieces of video information;

dividing the plurality of pieces of video information into target information and reference information;

identifying languages to which the plurality of pieces of video information is attributed by inputting the plurality of pieces of video information into the language classifier; and checking a confidence level of a target language with an aid of reference languages, wherein the target language is a language to which the target information is attributed and the reference languages are a plurality of languages to which the reference information is attributed.

According to some embodiments of the present disclosure, a language labeling computer device is provided. The language labeling computer device includes:

at least one processor;

a memory, configured to store at least one program;

wherein the at least one processor, when loading and running at least one program, is caused to perform the language labeling method as described above.

According to some embodiments of the present disclosure, a non-volatile computer-readable storage medium is provided. The non-volatile computer-readable storage medium stores one or more computer programs therein, wherein the one or more computer programs, when loaded and run by a processor, cause the processor to perform the language labeling method as described above.

BRIEF DESCRIPTION OF DRAWINGS

FIG. 2 is a flowchart of a language labeling method according to a second embodiment of the present disclosure;

DETAILED DESCRIPTION

The present disclosure is described in further detail with reference to the accompanying drawings and embodiments. The specific embodiments described herein are used only to explain the present disclosure. For ease of description, only those portions relevant to the present disclosure are illustrated in the accompanying drawings.

When the video data is processed, a classifier is typically used to label the text information with languages. Because the text information in the video data is mostly user-generated content, there are writing irregularities, such as spelling errors, abbreviations, transliteration, code-switching, and the like, which adversely affect the effectiveness of the classifier.

For covering the writing irregularities and training classifiers of high accuracy, a large amount of text information with the languages labeled is required, which mainly relies on technicians to manually label the text information with the languages. For each language, at least one technician familiar with this language is required. Proficiency in the language leads to a high technical threshold, and a slow speed and a small number of labeling by manual labeling results in low efficiency of the labeling.

In addition, the service data involves hundreds of different languages, and a classifier with high accuracy can only be obtained via training where the number of samples for each language reaches a certain quantity. For scarce languages (i.e., minority languages), it is time-consuming to acquire high-quality samples.

First Embodiment

Figure 1:
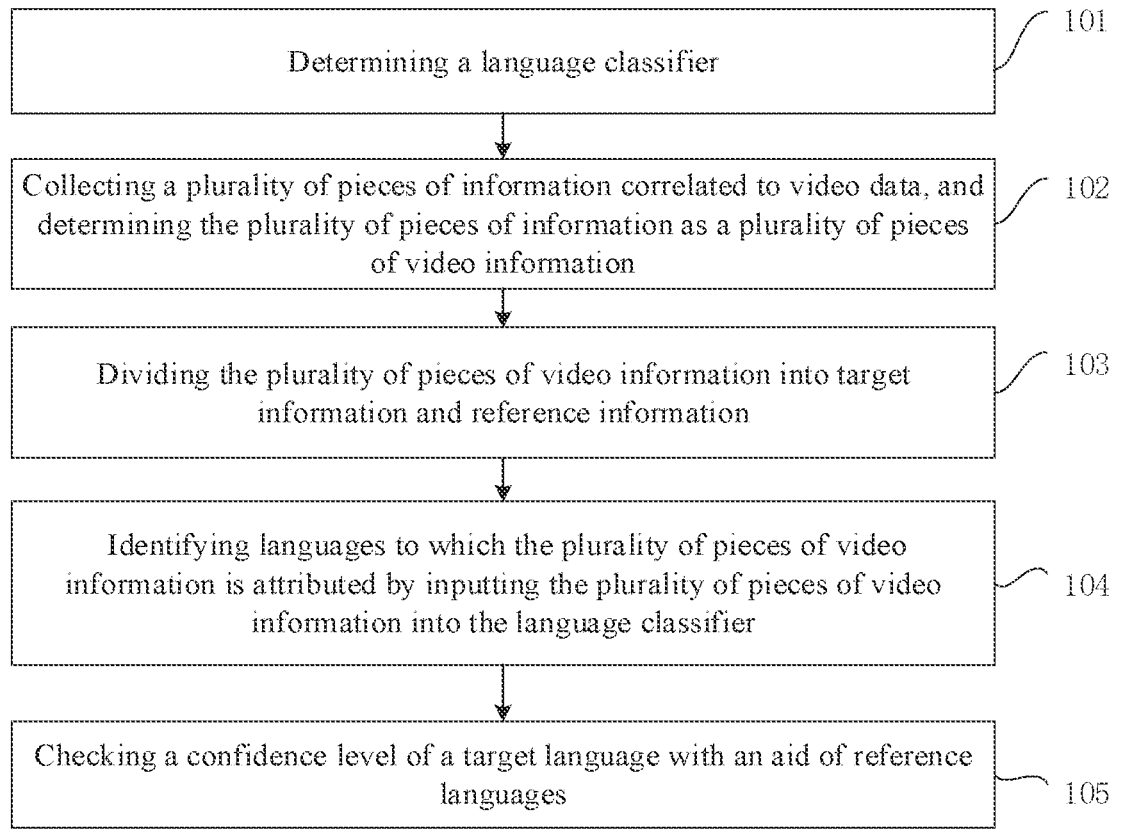
FIG. 1 is a flowchart of a language labeling method according to a first embodiment of the present disclosure.

FIG. 1 is a flowchart of a language labeling method according to the first embodiment of the present disclosure. This embodiment is applicable to a case where, for the same video data, the specified text information is labeled with a language with the aid of a portion of text information. The method is performed by a language labeling apparatus, which is implemented by software and/or hardware and is configured in a computer device, such as a server, a workstation, or a personal computer. The method includes the following steps.

In step 101, a language classifier is determined.

In some embodiments, the language classifier is provided, which is configured to identify a language to which text information is attributed. The language classifier is a classifier based on machine learning, such as a support vector machine (SVM) or a Bayesian model; or a classifier based on deep learning, such as a fast-text classifier or a text-convolutional neural network (Text-CNN), which is not limited herein.

In general, an input of the language classifier is text information, and an output of the language classifier is a language and a probability that the text information is attributed to the language.

In practice, the language classifier is pre-trained in a supervised manner. That is, a training set is generated, and the training set is a dataset with tags.

The training set includes a plurality of pieces of text information labeled with the attributed languages, or the training set includes a plurality of voice signals labeled with the attributed languages.

The text information is correlated or uncorrelated to video data. For example, some open-source language labeling training sets are adopted to crawl text information from web pages and manually label the attributed languages, or manually label text information correlated to video data with the attributed languages, which is not limited herein.

The language classifier is trained by cross-entropy loss function and gradient descent using the text information in the training set as training samples and the languages as training tags.

The language classifier is an initial version of the language classifier and is updated iteratively in the future, thus the training is stopped after i (i is a positive integer) rounds of iterative training, and the training of the language classifier is confirmed to be completed.

During the process of training the language classifier, evaluation parameters such as accuracy, recall rates, and F1 values are used as conditions for stopping the iterative training, which is not limited herein.

In step 102, a plurality of pieces of information correlated to the video data is collected, and the plurality of pieces of information is determined as a plurality of pieces of video information.

In some embodiments, a video pool is pre-created, which stores a plurality of pieces of video data whose text information is to be labeled with the languages. The video data is in the form of short videos, live streaming, TV dramas, movies, micro movies, and the like.

The appropriate video data is screened according to service needs and is put into the video pool. For example, in the case that an effect of pushing video data in a region is to be optimized, video data posted in a specified region is screened; or in the case that an effect of pushing video data in a period is to be optimized, video data posted in a specified period is screened, which is not limited herein.

For each video data in the video pool, a plurality of pieces of (i.e., two or more) information correlated to video data is collected from the contexts of the video data, and the collected information is considered as the video information.

In general, the video information and the training samples in the training set are of the same type. That is, in the case that the training sample in the training set is text information, the video information is text information; and in the case that the training sample in the training set is a voice signal, the video information is a voice signal.

For updating the language classifier, the video information is a dataset without tags (i.e., not being labeled with languages).

In some examples, the video information includes at least one of the followings.

1. Description Information

The description information is typically a copywriting describing the content of video data entered by a user who produces the video data for introducing the video data.

2. Copywriting Information Matched with a Cover

The user who produces the video data selects a frame of image data as the cover of the video data and inputs the copywriting information for the cover.

3. Subtitle Information

The subtitle information is typically text typed, by the user who produces the video data, in the video data based on the client's function.

4. First Feature Information

The first feature information is typically text information extracted from the cover by optical character recognition (OCR).

5. Second Feature Information

The second feature information is typically text information extracted from a plurality of frames of image data of the video data by OCR.

6. Comment Information

The comment information is typically a message posted by the user, as a viewer, upon viewing the video data.

The above video information is only an example. In practice, other video information, such as titles and voice signals, are provided according to actual needs, which is not limited herein. Furthermore, in addition to the above video information, those skilled in the art are capable of using other video information according to actual needs, which is not limited herein.

Each video data includes attribute values of the video information and the video identifier (ID), which facilitates the subsequent search for the corresponding video data and video information.

In step 103, the plurality of pieces of video information is divided into target information and reference information.

One or more sentences exist in each video information. For ease of processing, each video information is treated as one sentence in the embodiments during the process of labeling the video information with the languages, which conforms to the conventions of natural language processing.

For each sentence (i.e., each video information), the following cleaning and filtering are appropriately performed for the need of labeling languages.

1. Word Segmentation Processing

A sentence (i.e., video information) is segmented, according to a certain norm, from a continuous sequence into independent words by character matching, comprehension methods, and statistical methods.

2. Delete Emoticons

Emoticons, such as "(*^∇^*)", "o(╥﹏╥)o", and the like, which are not helpful to identify the type of the language, are deleted.

3. Eliminate Sentences that are Too Short

A sentence (i.e., video information) of which the number of words is less than a preset word threshold MIN_WORD_COUNT is eliminated.

The above cleaning and filtering methods are only examples. In practice, other cleaning and filtering methods are used according to actual needs, which are not limited herein. Furthermore, in addition to the above cleaning and filtering methods, those skilled in the art are capable of using other cleaning and filtering methods according to actual needs, which is not limited herein.

In some embodiments, for a plurality of pieces of video information of the same video data, the plurality of pieces of video information is divided into the target information and the reference information according to service needs. The target information is video information of the language to be labeled for updating the language classifier, and the reference information is other video information that assists in checking the confidence level of the language of the target information.

For the video data, correlations of the plurality of pieces of video information relative to the video data are determined, which are determined by the properties of the video information itself. Video information with the highest correlation is set as the target information, and video information other than the target information is set as the reference information.

In some examples, assuming that the plurality of pieces of video information includes description information, copywriting information matched with a cover, subtitle information, first feature information, second feature information, and comment information, the description information is mainly used to introduce the content of the video data and has the highest correlation with the video data, and thus the description information is set as the target information, and the reference information is set to include at least one of:

the copywriting information matched with the cover, the subtitle information, the first feature information, the second feature information, or the comment information.

In another example, assuming that the plurality of pieces of video information includes a voice signal, description information, copywriting information matched with a cover, subtitle information, first feature information, second feature information, and comment information, the voice signal mainly embodies the language content of the video data and has the highest correlation with the video data, and thus the voice signal is set as the target information, and the reference information is set to include at least one of:

the description information, the copywriting information matched with the cover, the subtitle information, the first feature information, the second feature information, and the comment information.

In step 104, the plurality of pieces of video information is input into the language classifier to identify languages to which the plurality of pieces of video information is attributed.

The plurality of pieces of video information (including the target information and the reference information) belonging to the same video data is input into the language classifier in the same batch for processing, and the languages to which the video information is attributed are output.

In step 105, the confidence level of the target language is checked with an aid of the reference languages.

In general, the language classifier belongs to a model of multiple classifications, and thus the language classifier is capable of outputting a plurality of languages to which each video data is attributed, and the probability that each video data is attributed to each language.

The target information is mainly used to label a language, and the language is unique. Therefore, a language with the highest probability in the plurality of languages output by the language classifier is determined as the language to which the target information is attributed, and other languages to which the target information is likely to be attributed are ignored. For ease of distinction, the language is referred to as a target language. That is, the target language is the language to which the target information is attributed.

The reference information is mainly used to assist the target information to check the confidence level of the labeled language, and a language with the highest probability to which the reference information is attributed is not necessarily to be the same as the target language. Therefore, the plurality of languages and their probabilities output by the language classifier are determined as the plurality of languages to which the reference information is attributed and their probabilities. For ease of distinction, the languages are referred to as reference languages. That is, the reference languages are the plurality languages to which the reference information is attributed.

Considering that for the same video data, the user who produces the video data is single, usually an individual or a team, the video data is mostly expressed in images and sounds, which are correlated to culture and language, and the audience of the video data is single, mostly in the same region as the user who produces the video data, and thus the language involved in the video data is usually single, and video information correlated to the video data involves the same language in most cases. Therefore, the confidence level that the language of the target information is the target language is checked with the aid of the fact that the reference information is attributed to the reference language (i.e., the plurality of reference languages and their probabilities).

For example, in the case that video data is a daily scene involving an English conversation, a user who produces the video data writes description information in English and adds a title in English, and a user, who is a viewer and understands the content of the video data, posts comment information in English in most cases.

In practice, a confidence range biased toward a middle level (i.e., the confidence level is general) is preset. An endpoint value of the confidence range is a first probability threshold MIN_PROB_1 and another endpoint value is a second probability threshold MIN_PROB_2. The second probability threshold MIN_PROB_2 is greater than the first probability threshold MIN_PROB_1.

A probability, that the language of the target information is the target language, is queried from results output by the language classifier for the target information, and the probability is determined as a target probability P_S.

The target probability P_S is compared with the confidence range.

In the case that the target probability P_S is within the confidence range, that is, the target probability P_S is greater than or equal to the first preset probability threshold MIN_PROB_1 and is less than or equal to the second preset probability threshold MIN_PROB_2, the confidence level that the language of the target information is the target language is general, and the language of the target information is the target language or the language of the target is not the target language. In this case, each reference information is traversed, a probability of the reference language that is identical to the target language is queried, and the probability is determined as a reference probability.

By summing, multiplying, averaging, and averaging after weighting, the confidence level Score that the target information is attributed to the target language is calculated by combining with the target probability and the reference probability, such that intensity that the reference information corroborates the language of the target information is the target language is characterized.

According to some embodiments, the check of the confidence level is performed by appropriate target information screened based on the confidence range, such that the number of target information is reduced, and thus the amount of computation is reduced and the efficiency is improved.

For example, a language (i.e., target language) with the highest probability of description information of video data is English, and the probability of English is general (e.g., 0.6). Formerly, for a lower probability, a confidence level of the prediction is usually determined to be insufficient and possibly not the correct prediction, and the description information and the target language are not used as a training sample to update the language classifier. In the case that in the same video data, copywriting information matched with the cover is predicted to be in English with a high probability (e.g., 0.8), this additional information is used to corroborate that the prediction that the description information is in English is correct. In this case, the description information, the copywriting information matched with the cover, and the target language are used as a training sample to update the language classifier, and thus a standard sample size is expanded.

In the case that the target probability P_S is outside the confidence range, there are two cases as follows.

1. In the case that the target probability P_S is less than the first probability threshold MIN_PROB_1, the confidence level that the language of the target information is the target language is low. That is, the confidence level is insufficient and the language of the target information is possibly not a normal language. The current video data and its video information are ignored in the current round of iteratively updating the language classifier.

The current video data and its video information in this round are ignored and are not deleted. In the case that the language classifier is updated in subsequent iterations, the performance of the language classifier is improved, and the target probability P_S is possibly greater than or equal to the first probability threshold MIN_PROB_1.

2. In the case that the target probability P_S is greater than the second probability threshold MIN_PROB_2, the confidence level that the language of the target information is the target language is high, and the language of the target information is directly identified as the target language without the need of checking the confidence level that the language of the target information is the target language with the aid of the fact that the reference information is attributed to the reference language.

In some embodiments, the language classifier is determined; the plurality of pieces of information correlated to the video data is collected; the plurality of pieces of information is used as the plurality of pieces of video information; the plurality of pieces of video information is divided into the target information and the reference information; the languages to which the plurality of pieces of video information is attributed are identified by inputting the plurality of pieces of video information into the language classifier; and the confidence level of the target language is checked with the aid of the reference language. The target language is the language to which the target information is attributed, and the reference languages are the plurality of languages to which the reference information is attributed. For the same video data, the user who produces the video data is single, the audience that the video data is aimed at is single, the language involved in the video data is also single, and the video information correlated to the video data involves the same language in most cases. Therefore, using the situation that the reference information is attributed to the reference language as an aid, the confidence level that the language of the target information is the target language is checked, such that the accuracy of predicting languages is improved.

Second Embodiment

FIG. 2 is a flowchart of a language labeling method according to a second embodiment of the present disclosure. The second embodiment illustrates, based on the previous embodiment, an operation of iteratively updating, based on semi-supervised learning, a language classifier. The method includes the following steps.

In step 201, a language classifier is determined.

In step 202, a plurality of pieces of information correlated to video data is collected, and the plurality of pieces of information is determined as a plurality of pieces of video information.

In step 203, the plurality of pieces of video information is divided into target information and reference information.

In step 204, the plurality of pieces of video information is input into the language classifier to identify languages to which the plurality of pieces of video information is attributed.

In step 205, a confidence level of a target language is checked with the aid of reference languages.

The target language is a language to which the target information is attributed, and the reference languages are a plurality of languages to which the reference information is attributed.

In step 206, in the case that the confidence level is greater than or equal to a preset confidence threshold, information similar to the video information is generated by using the video information as a reference, and the information is used as incremental information.

In some embodiments, the confidence level Score is compared with the preset confidence threshold MIN_SCORE. In the case that the confidence level Score is greater than or equal to the preset confidence threshold MIN_SCORE, the confidence level Score is high and the reference information has a high corroboration intensity for the target information. In this case, the information similar to the video information is generated by using the video information as a reference. For ease of distinction, text information is defined as incremental information.

Because the incremental information is generated with reference to the video information, the incremental information is treated as a sentence.

In some examples, incremental information is acquired by randomly deleting partial words from the video information under the constraints of a quantitative condition.

The quantity condition is that the proportion of words in the incremental information to words in the video information exceeds a first preset percentage threshold MIN_PERCENT_1.

In other examples, the incremental information is acquired by converting formats of some or all of the words in the video information into uppercase letters.

In other examples, the incremental information is acquired by converting the formats of some or all of the words in the video information into lowercase letters.

In other examples, the incremental information is acquired by deleting some or all of punctuation marks in the video information.

In other examples, the incremental information is acquired by deleting N (N is a positive integer, and N<M) words within a range of M (M is a positive integer) words in the video information.

The above methods of generating incremental information are only as examples and are used alone or in any combination. In practice, other ways of generating incremental information are provided according to actual needs, which are not limited herein. Furthermore, in addition to the above methods of generating incremental information, those skilled in the art are capable of using other ways of generating incremental information according to actual needs, which is not limited herein.

In step 207, the language classifier is invoked to detect the validity of the incremental information in identifying the target language.

In practice, users in some regions are accustomed to using two or more languages, and thus, there are words of two or more languages included in the video information, which affects the identification of the correct language by the language classifier.

In this case, the language predicted by the language classifier is a language with a large amount of training samples in the training set, which leads to an incorrect prediction.

For example, the video information includes 10 words, and the correct language of this video information is Hindi. Out of the 10 words, 7 words are Hindi words entered by transliterating, and the remaining 3 words are English words. Because training samples of English are large and training samples of Hindi words entered by transliterating are rare, the language classifier is likely to incorrectly predict the language of the video information to be English due to the stronger features of the 3 English words.

In some embodiments, the video information is verified by generating a new sentence (i.e., incremental information). That is, the language classifier is invoked to verify whether the incremental information is valid (validity) in identifying the target language, such that the accuracy of predicting languages is improved.

In practice, a language to which the incremental information is attributed is identified by inputting the incremental information into the language classifier for processing.

The incremental information is mainly used to verify the validity of the labeled language, and the language is unique. Therefore, a language with the highest probability in the plurality of languages output by the language classifier is determined as the language to which the incremental information is attributed, and other languages that the incremental information is likely to be attributed are ignored. For ease of distinction, the language is referred to as an incremental language. That is, the incremental language is the language to which the incremental information is attributed.

A proportion of incremental languages when the incremental languages are identical to the target languages is counted. That is, the first number of incremental languages that are identical to the target languages is counted, and the second number of all incremental languages is counted, and a ratio of the first number to the second number is counted as the proportion.

In the case that the proportion is greater than or equal to a second preset percentage threshold MIN_PERCENT_2 (e.g., 80%), the ambiguity that the incremental language is the target language is small, and the incremental information is valid for identifying the language.

In the case that the percentage is less than the second preset percentage threshold MIN_PERCENT_2 (e.g., 80%), the ambiguity that the incremental language is the target language is large, and the incremental information is invalid for identifying the language.

In step 208, in the case that the incremental information is valid for identifying the target language, the language classifier is updated based on the target language and at least one of the video information or the incremental information.

To automatically collect new data (video information, incremental information) with a correct labeled language, and to improve the performance of the language classifier by using the new data as training samples (text information or voice signals) at the same time, the collected data typically conforms to the following two rules.

1. The new data is not similar to the existing training samples in the current training set, such that the language classifier is capable of learning new features.

One indicator to determine whether the new data is similar to the existing training samples is to predict a probability of a language to which the new data is attributed by using the current language classifier. That is, in the case that the probability is low, the language classifier has not traversed that type of data in the training set and thus a low probability is predicted. Therefore, one option is to add the new data with the low probability to the training set.

2. The tag (language) of the new data is accurate, such that a language classifier of better performance is trained.

A common practice to ensure an accurate tag is to manually label the new data. To meet the requirement of automatic collection, an automated scheme is to treat a language with a high probability (e.g., more than 0.95) as a correct tag. The high probability means that the language classifier considers that the new data being attributed to that language is correct. Therefore, one option is to add the new data with the high probability to the training set.

The options used by the above two rules were previously in conflict with each other. That is, it is generally not possible to add data with a low probability and data with a high probability data to the training set simultaneously.

To solve the problem of the conflict between the two options, the present disclosure proposes to determine whether a language with a low probability predicted for the target information is correct by using the prediction of the reference information of the video data as a piece of supporting evidence. In the case that the predicted language with the low probability is determined to be correct, the two rules above are satisfied, and the target information is added to the training set. In this way, during the process of adding new features that are not involved or less involved previously to the training set the performance of the language classifier is improved, such that the accuracy of predicting and labeling languages is improved, and thus the integration of semi-supervised training the language classifier and automatically labeling tags is realized.

In the case that the incremental information is valid for identifying the target language, the language predicted for the newly generated incremental information is consistent with the language of the video information. In this case, the language prediction of the video information is determined to be unambiguous, and the video information and its target language are used to update the language classifier.

In the case that the incremental information is invalid for identifying the target language, the language predicted for the newly generated incremental information is inconsistent with the language of the video information, possibly because the video information includes words in different languages or some words have stronger features. In this case, the language prediction of the video information is determined to be ambiguous, and the video information and its target language are not used to update the language classifier.

In practice, the training set of the language classifier is acquired. The training set includes a plurality of text information (or voice signals), wherein the text information (or voice signals) in the training set has been labeled with the attributed languages. The text information (or voice signals) in the training set is text information (or voice signals) labeled initially, or video information and/or incremental information that has been subsequently labeled with languages by the language classifier, which is not limited herein.

In updating the language classifier by using the video information and its target language, the video information is added to the training set and the added video information is used as the text information (or voice signal) in the training set, and the target language is labeled as the language to which the video information is attributed.

Furthermore, in the case that the incremental information is valid for identifying the target language, suitable incremental information and its target language are used to update the language classifier.

Incremental information that is valid for updating the language classifier is screened, and the screened incremental information is added to the training set and used as the text information (or voice signal) in the training set, and the target language is labeled as the language to which the incremental information is attributed.

Exemplarily, the probability that the video information is attributed to the target language is defined to be a specified ratio MIN_RATIO (0<MIN_RATIO<1), and the specified ratio is used as a third probability threshold MIN_PROB_3 of the incremental information.

The probability that the incremental information is attributed to the target language (expressed as the probability that the incremental information is attributed to the incremental language that is identical to the target language) is compared with a first preset threshold MIN_PROS_1 and the third threshold MIN_PROS_3.

In the case that the probability that the incremental information is attributed to the target language is greater than or equal to the first preset threshold MIN_PROB_1 and is less than or equal to the third threshold MIN_PROB_3, the incremental information is valid for updating the language classifier. The probability that the incremental information is attributed to the target language is greater than or equal to the first threshold MIN_PROB_1.

In this example, the probability that the incremental information is attributed to the target language is general and is smaller than the probability that the video information is attributed to the target language, which indicates that the incremental information differs from the video information in that there are some transformations in the incremental information (e.g., some words are absent in the incremental information), leading to the decrease of the predicted probability, which is due to the fact that these transformations (e.g., the absent words) are stronger features for the language classifier in prediction, and the original information (e.g., the remaining words and the combinations thereof) are less familiar to the language classifier (e.g., has not been present in the current training set), and thus adding incremental information helps to improve the performance of the language classifier.

In addition, the language classifier is more sensitive to the training samples in the first h (h is a positive integer) rounds of iteratively updating, and the mistakes in labeling affect the performance of the language classifier and lead to the accumulation of more mistakes in subsequent iterations. Therefore, in the first h rounds of iterations, video information that has been pre-labeled with languages is used for iterations, and a language pre-labeled on the video information is determined from results output by the language classifier for the video information and the incremental information, and the language is determined as an actual language (i.e., the actual language of the video information) is determined, and the actual language is compared with the target language.

In the case that the actual language is the same as the target language, the video information is allowed to be added to the training set and used as the text information in the training set, and the target language is allowed to be labeled as the language to which the video information is attributed. And/or, the incremental information is allowed to be added to the training set and used as the text information in the training set, and the target language is allowed to be labeled as the language to which the incremental information is attributed.

In the case that the actual language is different from the target language, the target language and at least one of the video information or the incremental information are ignored. That is, the video information is prohibited to be added to the training set and used as the text information in the training set, and the target language is prohibited to be labeled as the language to which the video information is attributed. And/or, the incremental information is prohibited to be added to the training set and be used as the text information in the training set, and the target language is prohibited to be labeled as the language to which the incremental information is attributed.

In the case that the language classifier is updated by using the target language and at least one of the video information or the incremental information, whether a preset training condition is satisfied is detected. In the case that the preset training condition is satisfied, the language classifier is updated by using the text information in the training set as the training sample and using the labeled language as the training tag. In the case that the preset training condition is not satisfied, other video information and incremental information are continued to be added.

Exemplarily, during the process of detecting the training condition, the total amount of video information added to the training set upon the last update of the language classifier is counted, and the total amount is compared with a preset quantity threshold MAX_SENT_COUNT.

In the case that the total amount is greater than the preset quantity threshold MAX_SENT_COUNT, the preset training condition is determined to be satisfied.

The above training condition is only an example. In practice, other training conditions are provided according to actual needs. For example, upon the last update of the language classifier, the fact that the total amount of video information exceeds another quantity threshold is ignored, and in this case, the language classifier probably has defects, waiting to be updated as soon as possible to improve the performance. The training conditions are not limited herein. Furthermore, in addition to the above training conditions, those skilled in the art are capable of using other training conditions according to actual needs. which are not limited herein.

For ease of understanding the embodiments of the present disclosure by those skilled in the art, the language labeling method based on semi-supervised according to some embodiments of the present disclosure is described hereinafter by examples.

Figure 3:
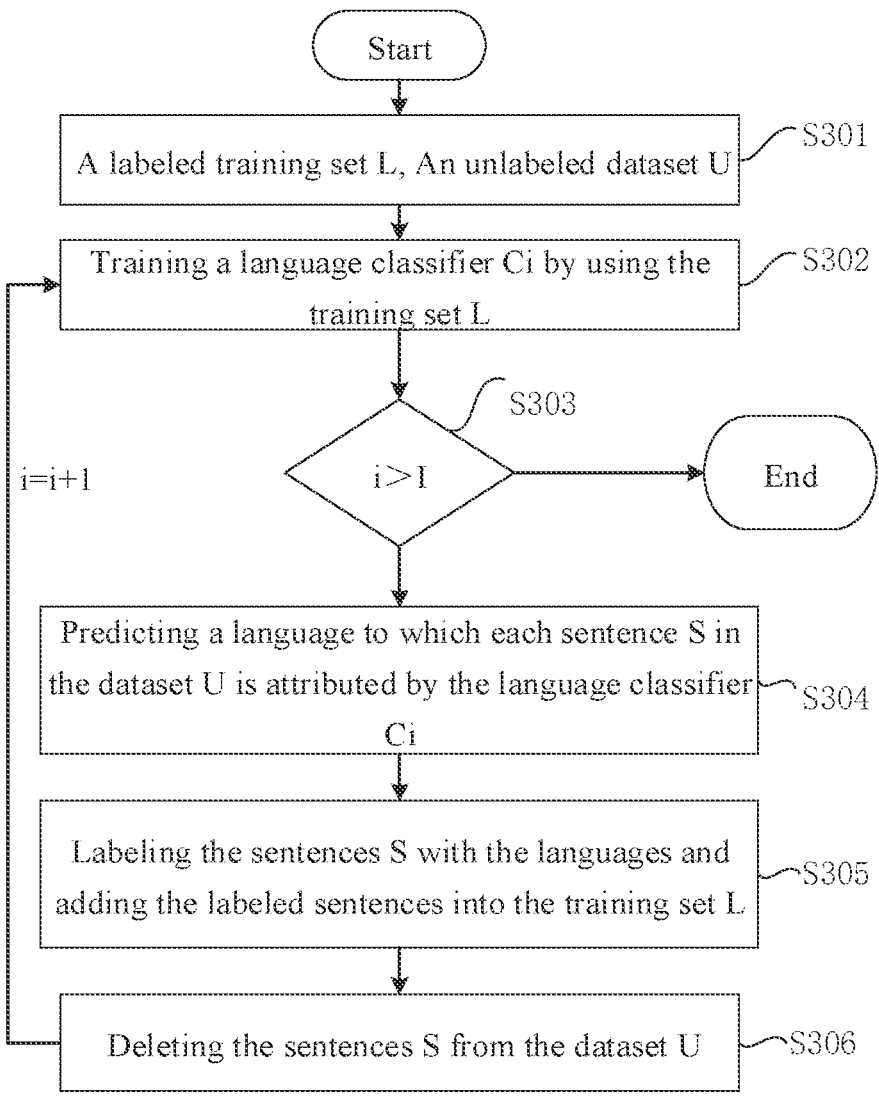
FIG. 3 is an overall flowchart of training a language classifier based on semi-supervised learning according to a second embodiment of the present disclosure.

As illustrated in FIG. 3, the times i of iterations is defined as 0. In S301, a labeled training set L is prepared. The training set L includes sentences (text information or voice signals) that have been labeled with languages and an unlabeled dataset U. The dataset U includes sentences (video information of video data) that have not been labeled with languages.

In S302, a language classifier Ci is trained by using the sentences in the training set L and their labeled languages.

In S303, whether i is greater than a threshold I is determined. In the case that i is greater than the threshold I, the process is ended. In the case that i is not greater than the threshold I, S304 is performed.

In S304, a language to which each sentence S in the dataset U is attributed is predicted by the language classifier Ci, wherein each language carries a probability.

In S305, the sentences S in the dataset are labeled with the languages and the labeled sentences are added to the training set L.

In S306, the sentences S added to the training set L are deleted from the dataset U. At this point, the times of iterations are increased by one (i.e., i=i+1) and the process returns to S302.

Figure 4:
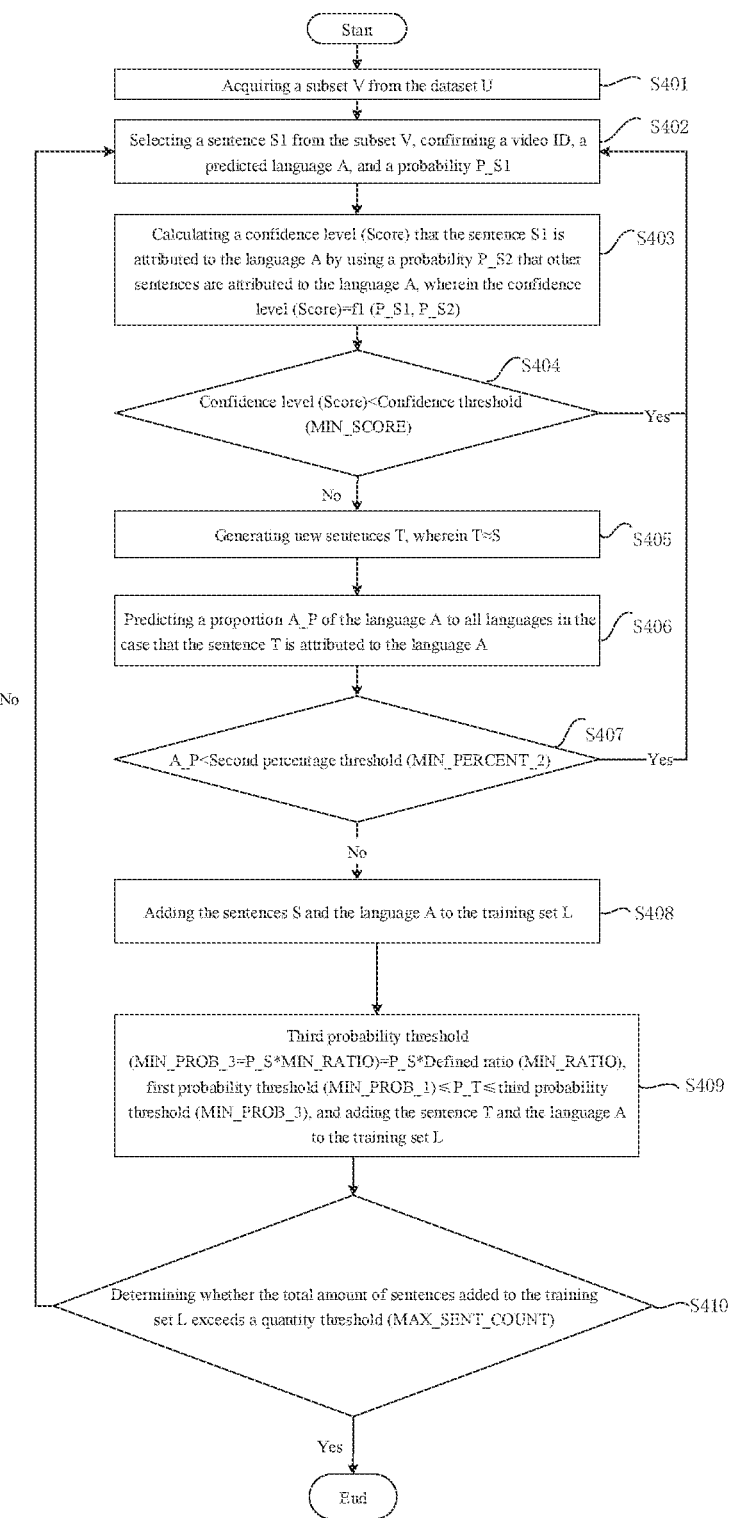
FIG. 4 is a partial flowchart of training a language classifier based on semi-supervised learning according to a second embodiment of the present disclosure.

For the implementation of S304, referring to FIG. 4, in S401, some sentences S1 (target information) are acquired from the dataset U as a subset V. The highest probability, in the languages to which the sentences S1 are attributed, is between a first probability threshold MIN_PROB_1 and a second probability threshold MIN_PROB_2.

In S402, a sentence S1 is randomly selected from the subset V, a video ID of video data where the sentence S is located is confirmed, a language A with the highest probability that the sentence S1 is predicted to be attributed is confirmed, and a probability P_S1 that the sentence S1 is attributed to the language A is confirmed.

In S403, other sentences S2 of the video data are acquired by using the video ID, and a confidence level Score of the sentence S1 is calculated by using a probability P_S2 that other sentences are predicted to be attributed to the language A. Score=f1 (P_S1, P_S2), wherein f1 is a fusion function, such as summing, multiplying, averaging, averaging upon weighting, and the like.

In S404, whether the confidence level Score is less than a confidence threshold MIN_SCORE is determined. In the case that the confidence level Score is less than the confidence threshold MIN_SCORE, sentences S (including sentences S1 and S2) are not chosen and the process returns to perform S402. In the case that the confidence level Score is not less than the confidence threshold MIN_SCORE, then S405 is performed.

In S405, a plurality of new sentences T (incremental information) are generated, wherein the sentences T are similar to the sentences S.

Exemplarily, the sentence T is acquired by deleting partial words from the sentence S. A proportion of words in the sentence T to words in the sentence S exceeds a first percentage threshold MIN_PERCENT_1.

In S406, the language classifier Ci is invoked to respectively predict a plurality of languages to which the plurality of sentences T are attributed. In the case that the predicted language is A, the probability of the language A is P_T. A proportion A_P of the language A to all languages is calculated.

In S407, whether the proportion A_P is less than the second percentage threshold MIN_PERCENT_2 is determined. In the case that the percentage A_P is less than the second percentage threshold MIN_PERCENT_2, the sentence S is not chosen and the process returns to perform S402. In the case that the percentage A_P is not less than the second percentage threshold MIN_PERCENT_2, S408 is performed.

In S408, the sentences S (including sentences S1 and S2) are labeled with the language A and added to the training set L.

In S409, a third probability threshold MIN_PROB_3 is defined to be equal to P_S*MIN_RATIO. P_S=f2 (P_S1, P_S2), and f2 is a selection function, such as selecting a maximum value, selecting an average value, and the like, and 0<MIN_RATIO<1.

In the case that the sentence T is attributed to the $MIN\_PROS\_1 \leq P\_T \leq MIN\_PROS\_3$ of the language A, the sentence T is labeled with the language A and added to the training set L.

In S410, the total amount of sentences S and T added to the training set L is counted, and whether the total amount exceeds the quantity threshold MAX_SENT_COUNT is determined. In the case that the total amount exceeds the quantity threshold MAX_SENT_COUNT, the process is stopped, and the language classifier Ci is waiting to be updated by using the training set L. Otherwise, the process returns to perform S402.

For simplicity of description, the method embodiments are described as a series of actions, but those skilled in the art should be aware that the embodiments of the present disclosure are not limited by the sequence of the actions described above, because some steps may be performed in other sequences or simultaneously according to the embodiments of the present disclosure. Secondly, those skilled in the art should also be aware that the embodiments described in the specification belong to optional embodiments, and the actions involved are not necessary for the embodiments of the present disclosure.

Third Embodiment

Figure 5:
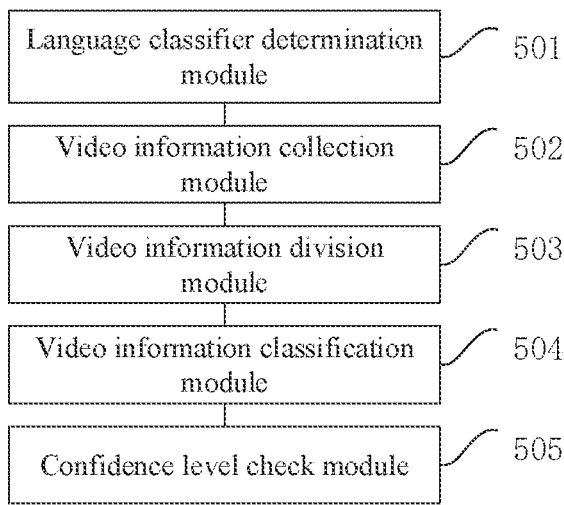
FIG. 5 is a schematic structural diagram of a language labeling apparatus according to a third embodiment of the present disclosure.

FIG. 5 is a structural block diagram of a language labeling apparatus according to a third embodiment of the present disclosure. The apparatus includes:

a language classifier determination module 501, configured to determine a language classifier; a video information collection module 502, configured to collect a plurality of information correlated to video data and determine the plurality of pieces of information as a plurality of pieces of video information; a video information division module 503, configured to divide the plurality of pieces of video information into target information and reference information; a video information classification module 504, configured to identify languages to which the plurality of pieces of video information is attributed by inputting the plurality of pieces of video information into the language classifier; and a confidence level check module 505, configured to check a confidence level of a target language with an aid of reference languages, wherein the target language is a language to which the target information is attributed and the reference languages are a plurality of languages to which the reference information is attributed.

In some embodiments of the present disclosure, the language classifier determination module 501 includes:

a training set generation module, configured to generate a training set, wherein the training set includes a plurality of pieces of text information, and each text information has been labeled with an attributed language; and a language classifier training module, configured to train the language classifier by using each text information in the training set as a training sample and using the language to which the text information has been labeled as a training tag.

In some embodiments of the present disclosure, the video information division module 503 includes:

a correlation determination module, configured to determine correlations of the plurality of pieces of video information relative to the video data; a target information setting module, configured to set video information with the highest correlation as the target information; and a reference information setting module, configured to set video information other than the target information in the plurality of pieces of video information as the reference information.

In some embodiments of the present disclosure, the video information includes at least one of:

description information, copywriting information matched with a cover, subtitle information, first feature information, second feature information, or comment information;

wherein the first feature information is text information extracted from the cover, and the second feature information is text information extracted from a plurality of pieces of frames of image data of the video data.

The target information is the description information, and the reference information includes at least one of:

the copywriting information matched with the cover, the subtitle information, the first feature information, the second feature information, or the comment information.

In some embodiments of the present disclosure, the confidence level check module 505 includes:

a target probability query module, configured to query a probability of the target language and determine the probability of the target language as a target probability; a reference probability query module, configured to query, in the case that the target probability is greater than or equal to a first preset probability threshold and less than or equal to a second preset probability threshold, a probability of reference languages that are identical to the target language and use the probability of the reference languages as a reference probability; a probability fusion module, configured to calculate a confidence level that the target information is attributed to the target language by combining the target probability with the reference probability.

In some embodiments of the present disclosure, the apparatus further includes:

an incremental information generation module, configured to generate, in the case that the confidence level is greater than or equal to a preset confidence threshold, information similar to the video information to serve as incremental information; a validity detection module, configured to invoke the language classifier to detect a validity of the incremental information in identifying the target language; and a language classifier update module, configured to update the language classifier based on the target language and at least one of the video information or the incremental information in the case that the incremental information is valid for identifying the target language.

In some embodiments of the present disclosure, the incremental information generation module includes:

a first word deletion module, configured to, under constraints of a quantity condition, acquire the incremental information by deleting partial words from the video information, wherein the quantity condition is that a proportion of words in the incremental information to words in the video information exceeds a first preset percentage threshold; and/or, a first letter conversion module, configured to acquire the incremental information by converting formats of the words in the video information into uppercase letters; and/or, a second letter conversion module, configured acquire the incremental information by converting the formats of the words in the video information into lowercase letters; and/or, a punctuation deletion module, configured to acquire the incremental information by deleting punctuation marks in the video information; and/or, a second word deletion module, configured to acquire the incremental information by deleting N words, within a range of M words, in the video information.

In some embodiments of the present disclosure, the validity detection module includes: an incremental information classification module, configured to identify a language to which the incremental information is attributed by inputting the incremental information into the language classifier and to use the language as an incremental language; a proportion counting module, configured to count a proportion of incremental languages that are identical to the target language; and a validity determination module, configured to determine that the incremental information is valid for identifying languages in the case that the percentage is greater than or equal to a second preset percentage threshold.

In some embodiments of the present disclosure, the language classifier update module includes:

a training set acquisition module, configured to acquire the training set of the language classifier, wherein the training set includes the plurality of pieces of text information, and each text information has been labeled with a language to which the text information is attributed; a video information addition module, configured to add the video information into the training set to serve as text information in the training set; a video information labeling module, configured to label the target language as a language to which the video information is attributed; a training condition detection module, configured to detect whether a preset training condition is satisfied, in the case that the preset training condition is satisfied, an iterative training module is invoked; the iterative training module, configured to update the language classifier by using the text information in the training set as a training sample and the labeled language as a training tag.

In some embodiments of the present disclosure, the training condition detection module includes:

a total amount counting module, configured to count the total amount of video information added to the training set upon a last update of the language classifier; and a satisfying determination module, configured to determine that the preset training condition is satisfied in the case that the total amount is greater than a preset quantity threshold.

In some embodiments of the present disclosure, the language classifier update module further includes:

an incremental information screening module, configured to screen the incremental information valid for updating the language classifier; an incremental information addition module, configured to add the screened incremental information into the training set to serve as the text information in the training set; and an incremental information labeling module, configured to label the target language as the language to which the incremental information is attributed.

In some embodiments of the present disclosure, the incremental information screening module includes:

a probability threshold setting module, configured to acquire a specified proportion of the probability that the video information is attributed to the target language to serve as a third probability threshold of the incremental information; and a valid determination module, configured to determine that the incremental information is valid for updating the language classifier in the case that the probability that the incremental information is attributed to the target language is greater than or equal to a first preset threshold and less than or equal to the third threshold, wherein the probability that the target information is attributed to the target language is greater than or equal to the first threshold.

In some embodiments of the present disclosure, the language classifier update module further includes:

an actual language determination module, configured to determine a language labeled to the video information and use the determined language as an actual language; and a sample ignoring module, configured to ignore the target language and at least one of the video information or the incremental information in the case that the actual language is different from the target language. The language labeling apparatus according to some embodiments of the present disclosure is capable of performing the labeling method according to any of the embodiments of the present disclosure and has functional modules and effects corresponding to performing the method.

Fourth Embodiment

Figure 6:
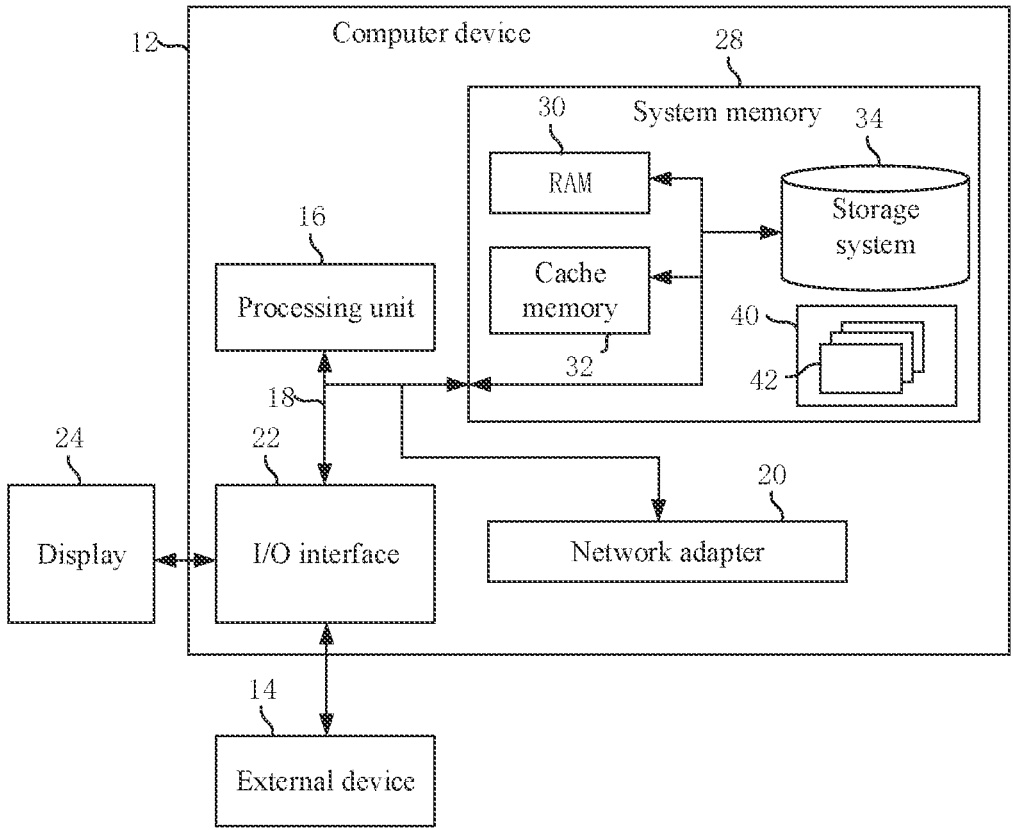
FIG. 6 is a schematic structural diagram of a computer device according to a fourth embodiment of the present disclosure.

FIG. 6 is a schematic structural diagram of a computer device according to a fourth embodiment of the present disclosure. FIG. 6 illustrates a block diagram of an exemplary computer device 12 suitable for implementing the embodiments of the present disclosure. The computer device 12 illustrated in FIG. 6 is only an example and should not impose any limitations on the functions or scope of use of the embodiments of the present disclosure.

As illustrated in FIG. 6, the computer device 12 is represented in the form of a general computer device. Components of the computer device 12 include, but are not limited to, one or more processors or processing units 16, a system memory 28, and a bus 18 connecting different system components (including the system memory 28 and the processing units 16).

The system memory 28 includes a computer system readable media in the form of volatile memory, such as a random access memory (RAM) 30 and/or a cache memory 32. As an example, a storage system 34 is arranged to read and write a non-removable, non-transitory, non-volatile magnetic media (not illustrated in FIG. 6, commonly referred to as a "hard disk drive"). The memory 28 includes at least one program product including a set of (e.g., at least one) program modules. The program modules are configured to perform the functions of the embodiments of the present disclosure.

A program/utility 40 including a set of (at least one) program modules 42 is stored in, for example, the memory 28. The program module 42 typically performs the functions and/or methods of the embodiments described in the present disclosure.

The computer device 12 is also communicated with one or more external devices 14 (e.g., a keyboard, a pointing device, a display 24, and the like). Such communication is performed via an input/output (I/O) interface 22. The computer device 12 is also communicated with one or more networks (e.g., Local Area Network (LAN), Wide Area Network (WAN), and/or public networks, such as the Internet) via a network adapter 20.

The processing unit 16 performs a variety of functional applications and data processing, such as implementing the language labeling method according to some embodiments of the present disclosure, by running one or more programs stored in the system memory 28.

Seventh Embodiment

The seventh embodiment of the present disclosure further provides a computer-readable storage medium storing one or more computer programs therein. The one or more computer programs, when loaded and run by a processor, cause the processor to perform a plurality of processes of the above language labeling method, and achieves the same technical effect, which is not repeated herein.

The computer-readable storage medium includes, for example, but is not limited to, electrical, magnetic, optical, electromagnetic, infrared, or semiconductor systems, apparatus, devices, or any combination thereof. Examples of the computer-readable storage medium (a non-exhaustive list) include an electrical connection with one or more wires, a portable computer disk, a hard disk, a random access memory (RAM), a read-only memory (ROM), an erasable programmable read-only memory (EPOM), or a flash memory, an optical fiber, a compact disc read-only memory (CD-ROM), an optical storage device, a magnetic memory device, or any suitable combination thereof. In the present disclosure, the computer-readable storage medium is any tangible medium including or storing one or more programs, wherein the one or more programs are used by or in combination with an instruction execution system, apparatus, or device.

What is claimed is:

1. A language labeling method, comprising:

determining a language classifier;

collecting a plurality of pieces of information correlated to video data, and determining the plurality of pieces of information as a plurality of pieces of video information;

dividing the plurality of pieces of video information into target information and reference information;

identifying languages to which the plurality of pieces of video information is attributed by inputting the plurality of pieces of video information into the language classifier; and checking a confidence level of a target language with an aid of reference languages, wherein the target language is a language to which the target information is attributed and the reference languages are a plurality of languages to which the reference information is attributed;

in a case that the confidence level is greater than or equal to a preset confidence threshold, generating information similar to the video information to serve as incremental information;

invoking the language classifier to detect a validity of the incremental information in identifying the target language; and in a case that the incremental information is valid for identifying the target language, updating the language classifier based on the target language and at least one of the video information or the incremental information.

2. The method according to claim 1, wherein determining the language classifier comprises:

generating a training set, wherein the training set comprises a plurality of pieces of text information, and each text information has been labeled with a language to which the text information is attributed; and training the language classifier by using each text information in the training set as a training sample and using the language to which the text information has been labeled as a training tag.

3. The method according to claim 1, wherein dividing the plurality of pieces of video information into the target information and the reference information comprises:

determining correlations of the plurality of pieces of video information relative to the video data;

setting video information with a highest correlation as the target information; and setting video information of the plurality of pieces of video information other than the target information as the reference information.

4. The method according to claim 3, wherein the video information comprises at least one of: description information, copywriting information matched with a cover, subtitle information, first feature information, second feature information, or comment information, wherein the first feature information is text information extracted from the cover, and the second feature information is text information extracted from a plurality of frames of image data of the video data; and in a case that the target information is the description information, the reference information comprises at least one of the copywriting information matched with the cover, the subtitle information, the first feature information, the second feature information, or the comment information.

5. The method according to claim 1, wherein checking the confidence level of the target language with the aid of the reference languages comprises:

querying a probability of the target language, and determining the probability of the target language as a target probability;

querying, in a case that the target probability is greater than or equal to a first preset probability threshold and less than or equal to a second preset probability threshold, a probability of reference languages that are identical to the target language, and determining the probability of the reference languages as a reference probability; and calculating, in combination with the target probability and the reference probability, the confidence level that the target information is attributed to the target language.

6. The method according to claim 1, wherein generating the information similar to the video information to serve as the incremental information comprises at least one of:

acquiring the incremental information by deleting partial words from the video information under constraints of a quantity condition, wherein the quantity condition is that a proportion of words in the incremental information to words in the video information exceeds a first preset percentage threshold;

acquiring the incremental information by converting formats of the words in the video information into uppercase letters;

acquiring the incremental information by converting the formats of the words in the video information into lowercase letters;

acquiring the incremental information by deleting punctuation marks in the video information; or acquiring the incremental information by deleting N words, within a range of M words, in the video information, wherein M is greater than N, and both M and N are positive integers.

7. The method according to claim 1, wherein invoking the language classifier to detect the validity of the incremental information in identifying the target language comprises:

identifying a language to which the incremental information is attributed by inputting the incremental information into the language classifier, and determining the language as an incremental language;

counting a proportion of incremental languages that are identical to the target language; and in a case that the proportion is greater than or equal to a second preset percentage threshold, determining that the incremental information is valid for identifying the languages.

8. The method according to claim 1, wherein updating the language classifier based on the target language and at least one of the video information or the incremental information comprises:

acquiring a training set of the language classifier, wherein the training set comprises a plurality of pieces of text information, and each text information has been labeled with a language to which the text information is attributed;

adding the video information into the training set to serve as text information in the training set;

labeling the target language as a language to which the video information is attributed;

detecting whether the training set satisfies a preset training condition; and in response to satisfying the preset training condition, updating the language classifier by using the text information in the training set as a training sample and using the labeled language as a training tag.

9. The method according to claim 8, wherein detecting whether the training set satisfies the preset training condition comprises:

counting a total amount of video information added to the training set upon a last update of the language classifier; and determining that the preset training condition is satisfied in a case that the total amount is greater than a preset quantity threshold.

10. The method according to claim 8, wherein updating the language classifier based on the target language and at least one of the video information or the incremental information further comprises:

screening incremental information that is valid for updating the language classifier;

adding the incremental information as screened into the training set to serve as the text information in the training set; and labeling the target language as a language to which the incremental information is attributed.

11. The method according to claim 10, wherein screening the incremental information that is valid for updating the language classifier comprises:

acquiring a specified proportion of a probability that the video information is attributed to the target language to serve as a third probability threshold of the incremental information;

in a case that the probability that the incremental information is attributed to the target language is greater than or equal to a first preset threshold and less than or equal to the third probability threshold, determining that the incremental information is valid for updating the language classifier, wherein the probability that the target information is attributed to the target language is greater than or equal to the first preset threshold.

12. The method according to claim 8, wherein updating the language classifier based on the target language and at least one of the video information or the incremental information further comprises:

determining a language labeled to the video information to serve as an actual language; and ignoring the target language and at least one of the video information or the incremental information in a case that the actual language is different from the target language.

13. A language labeling computer device, comprising:

at least one processor;

a memory, configured to store at least one program;

wherein the at least one processor, when loading and running the at least one program, is caused to perform:

determining a language classifier;

collecting a plurality of pieces of information correlated to video data, and determining the plurality of pieces of information as a plurality of pieces of video information;

dividing the plurality of pieces of video information into target information and reference information;

identifying languages to which the plurality of pieces of video information is attributed by inputting the plurality of pieces of video information into the language classifier; and checking a confidence level of a target language with an aid of reference languages, wherein the target language is a language to which the target information is attributed and the reference languages are a plurality of languages to which the reference information is attributed;

in a case that the confidence level is greater than or equal to a preset confidence threshold, generating information similar to the video information to serve as incremental information;

invoking the language classifier to detect a validity of the incremental information in identifying the target language; and in a case that the incremental information is valid for identifying the target language, updating the language classifier based on the target language and at least one of the video information or the incremental information.

14. The language labeling computer device according to claim 13, wherein the at least one processor, when loading and running the at least one program, is caused to perform:

generating a training set, wherein the training set comprises a plurality of pieces of text information, and each text information has been labeled with a language to which the text information is attributed; and training the language classifier by using each text information in the training set as a training sample and using the language to which the text information has been labeled as a training tag.

15. The language labeling computer device according to claim 13, wherein the at least one processor, when loading and running the at least one program, is caused to perform:

determining correlations of the plurality of pieces of video information relative to the video data;

setting video information with a highest correlation as the target information; and setting video information of the plurality of pieces of video information other than the target information as the reference information.

16. The language labeling computer device according to claim 15, wherein the video information comprises at least one of: description information, copywriting information matched with a cover, subtitle information, first feature information, second feature information, or comment information, wherein the first feature information is text information extracted from the cover, and the second feature information is text information extracted from a plurality of frames of image data of the video data; and in a case that the target information is the description information, the reference information comprises at least one of the copywriting information matched with the cover, the subtitle information, the first feature information, the second feature information, or the comment information.

17. The language labeling computer device according to claim 13, wherein the at least one processor, when loading and running the at least one program, is caused to perform:

querying a probability of the target language, and determining the probability of the target language as a target probability;

querying, in a case that the target probability is greater than or equal to a first preset probability threshold and less than or equal to a second preset probability threshold, a probability of reference languages that are identical to the target language, and determining the probability of the reference languages as a reference probability; and calculating, in combination with the target probability and the reference probability, the confidence level that the target information is attributed to the target language.

18. A non-transitory computer-readable storage medium, storing one or more computer programs therein, wherein the one or more computer programs, when loaded and run by a processor, causes the processor to perform:

determining a language classifier;

collecting a plurality of pieces of information correlated to video data, and determining the plurality of pieces of information as a plurality of pieces of video information;

dividing the plurality of pieces of video information into target information and reference information;

identifying languages to which the plurality of pieces of video information is attributed by inputting the plurality of pieces of video information into the language classifier; and checking a confidence level of a target language with an aid of reference languages, wherein the target language is a language to which the target information is attributed and the reference languages are a plurality of languages to which the reference information is attributed;

in a case that the confidence level is greater than or equal to a preset confidence threshold, generating information similar to the video information to serve as incremental information;

invoking the language classifier to detect a validity of the incremental information in identifying the target language; and in a case that the incremental information is valid for identifying the target language, updating the language classifier based on the target language and at least one of the video information or the incremental information.

\* \* \* \* \*